US012317058B2

(12) United States Patent
Sangston

(10) Patent No.: US 12,317,058 B2
(45) Date of Patent: May 27, 2025

(54) SYSTEMS AND METHODS FOR MODIFYING SPATIAL AUDIO

(71) Applicant: Sony Interactive Entertainment Inc., Tokyo (JP)

(72) Inventor: Brandon Sangston, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 320 days.

(21) Appl. No.: 18/117,368

(22) Filed: Mar. 3, 2023

(65) Prior Publication Data

US 2024/0298131 A1 Sep. 5, 2024

(51) Int. Cl.
*H04S 7/00* (2006.01)

(52) U.S. Cl.
CPC ........... *H04S 7/302* (2013.01); *H04S 2400/11* (2013.01)

(58) Field of Classification Search
CPC ........ H04S 7/30; H04S 7/302; H04S 2400/11; H04S 2420/11
USPC .......................................................... 381/303
See application file for complete search history.

(56) References Cited

U.S. PATENT DOCUMENTS

2018/0352360 A1 12/2018 Chen et al.
2020/0145776 A1* 5/2020 Herre ...................... G06F 3/011
2021/0289310 A1 9/2021 Herre et al.

OTHER PUBLICATIONS

PCT/US2024/016786 Notification of Transmittal of the International Search Report and the Written Opinion of the International Searching Authority, or the Declaration, PCT/ISA/220, and the International Search Report, PCT/ISA/210, May 14, 2024.

* cited by examiner

*Primary Examiner* — Paul Kim
(74) *Attorney, Agent, or Firm* — Kilpatrick Townsend & Stockton LLP

(57) ABSTRACT

Systems and methods for modifying spatial audio are described. One of the methods includes obtaining a first set of metadata for a first set of audio data and a second set of metadata for a second set of audio data. The first and second sets of metadata and the first and second sets of audio data are associated with a display of a virtual scene. The method further includes encoding the first set of audio data to output a first soundfield and the second set of audio data to output a second soundfield. The method also includes mixing the first and second soundfields to output a mixed soundfield, decoding the mixed soundfield based on at least one of the first set of metadata and the second set of metadata to provide mixed audio data, and outputting the mixed audio data as an audio output.

14 Claims, 6 Drawing Sheets

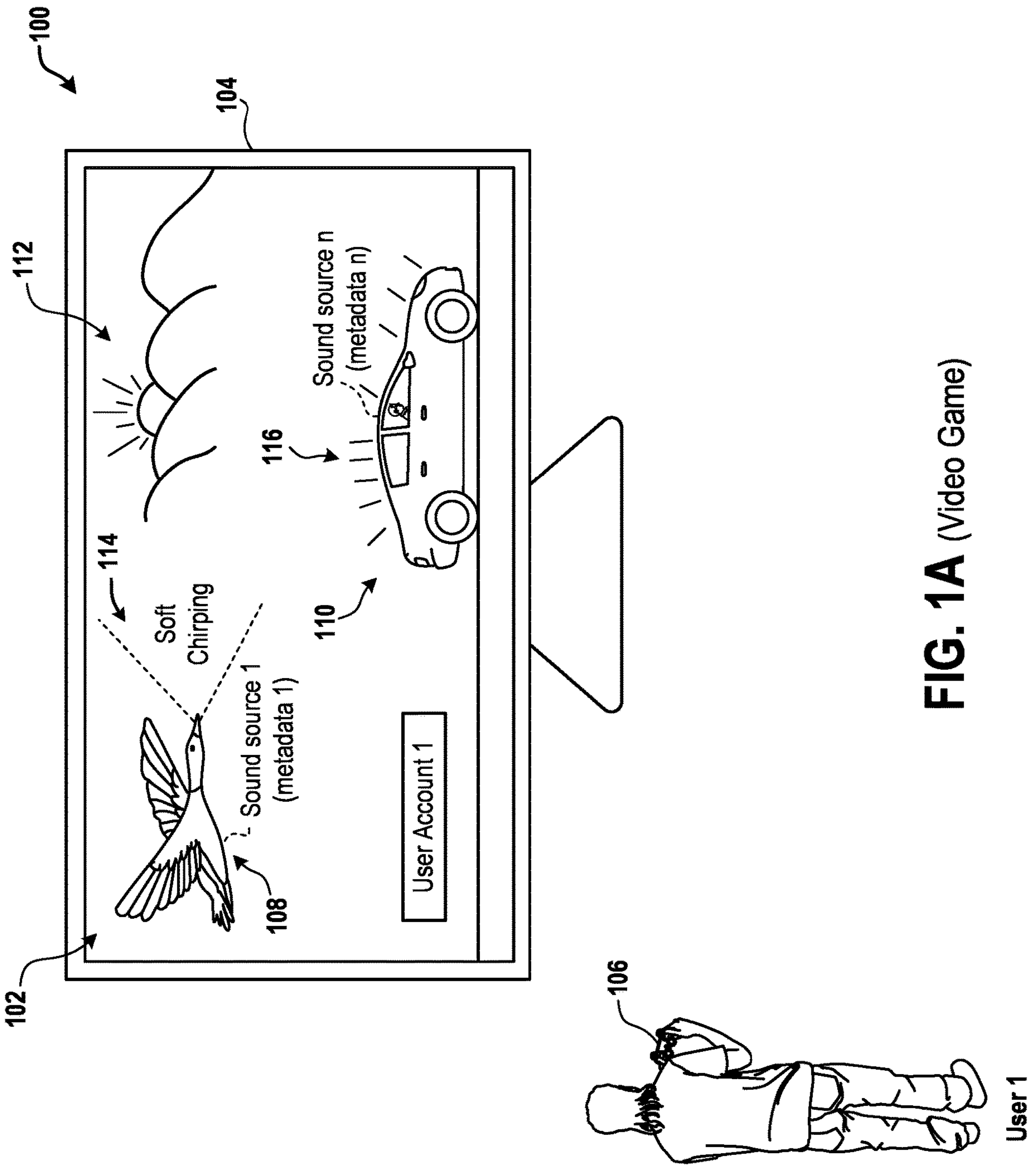
FIG. 1A (Video Game)

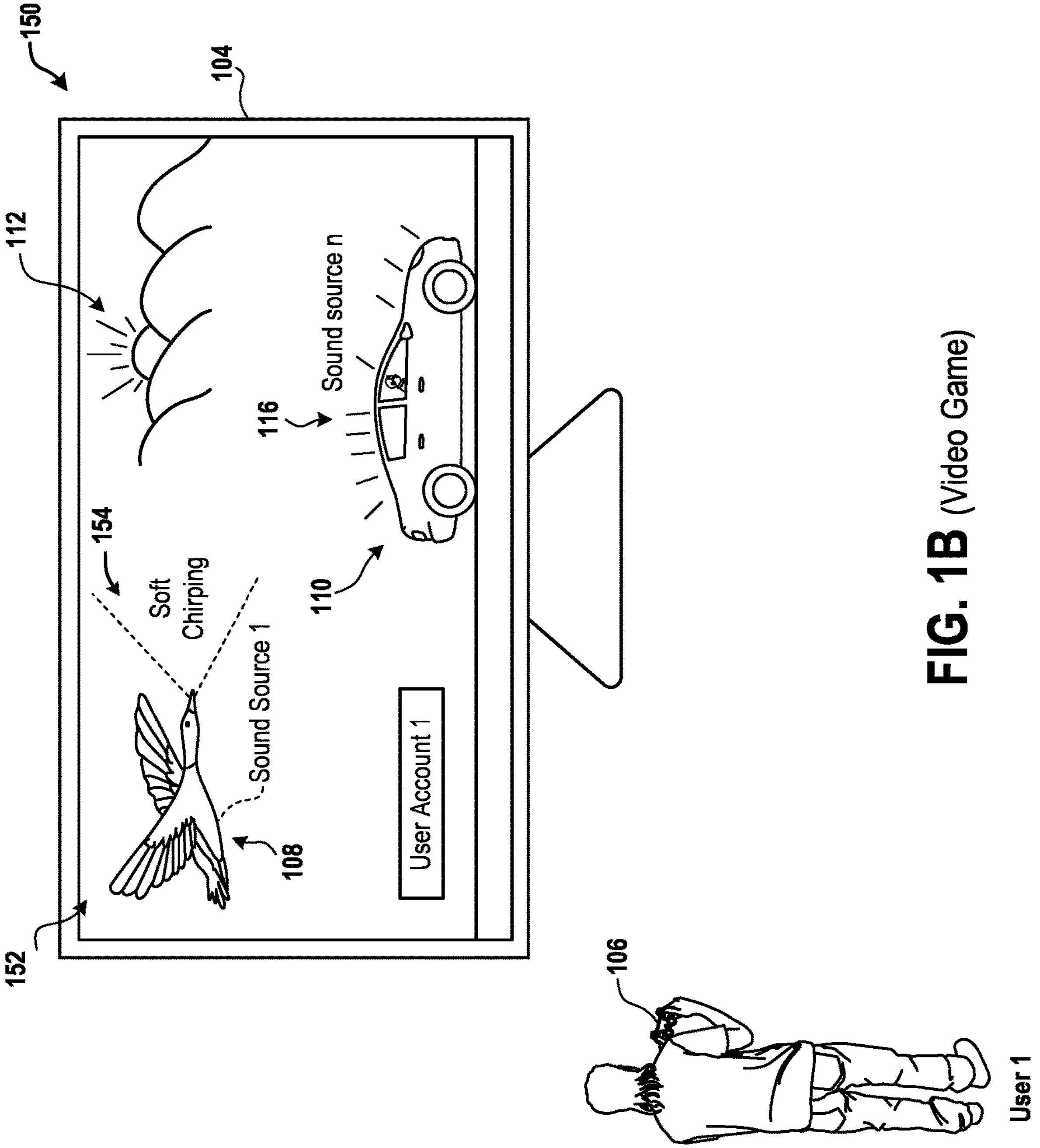
FIG. 1B (Video Game)

FIG. 3 ( Metadata)

SYSTEMS AND METHODS FOR MODIFYING SPATIAL AUDIO

FIELD

The present disclosure relates to systems and methods for modifying spatial audio are described.

BACKGROUND

Audio is an important component in the experience of playing video games and the art of producing game sound has become more and more sophisticated as the industry has grown. Game sound in current generation games is produced using audio objects, which are processed in a game console to generate a speaker channel-based program. The speaker channel-based program, which comprises a number of speaker channels, is typically encoded, such as an AC-3 or E-AC-3 bitstream, and the encoded audio is delivered to a rendering system. To implement playback, the rendering system generates speaker feeds in response to the speaker channels indicated by the encoded audio.

It is in this context that embodiments of the invention arise.

SUMMARY

Embodiments of the present disclosure provide systems and methods for modifying spatial audio.

In an embodiment, a method for providing metadata of objects, such as sound sources, contained in a multichannel soundfield for compression and/or optimized spatial audio decoding, such as rendering, are described.

In one embodiment, an object-based audio representation entails a number of the objects with a corresponding audio stream and associated spatial metadata, such as three-dimensional (3D) position, angular spread, volume, etc. This approach maintains the meta-data, but encodes the audio stream to a multi-channel soundfield, such as ambisionics, to be later output as sound, such as audio output, via loud speakers. Effectively, this provides a complete soundfield with additional tags, such as hints, as to where and how sounds from the sound sources are to be played back to a listener. The metadata can be used to optimize a spatial rendering solution, or as a spatial audio compression scheme for digital-based audio. The audio output can be via binaural or multichannel loudspeakers.

In an embodiment, an encoder that transforms multiple independent object audio streams into a multichannel soundfield representation based on object metadata, such as a position of each object, a direction of emission of sound by the object, and an angular spread of the emission, is provided. The multichannel soundfield is an example of an encoded soundfield. Instead of discarding the object metadata, a decoder is provided with the multichannel soundfield such that the decoder has more information with which to properly decode the soundfield for a listener.

In an embodiment, a method for modifying spatial audio is described. The method includes obtaining a first set of metadata for a first set of audio data and a second set of metadata for a second set of audio data. The first and second sets of metadata and the first and second sets of audio data are associated with a display of a virtual scene. The method further includes encoding the first set of audio data to output a first soundfield and the second set of audio data to output a second soundfield. The method also includes mixing the first and second soundfields to output a mixed soundfield, decoding the mixed soundfield based on at least one of the first set of metadata and the second set of metadata to provide mixed audio data, and outputting the mixed audio data as an audio output.

In one embodiment, a system for modifying spatial audio is described. The system includes a processor that obtains a first set of metadata for a first set of audio data and a second set of metadata for a second set of audio data. The first and second sets of metadata and the first and second sets of audio data are associated with a display of a virtual scene. The processor encodes the first set of audio data to output a first soundfield and the second set of audio data to output a second soundfield. The processor also mixes the first and second soundfields to output a mixed soundfield. The processor decodes the mixed soundfield based on at least one of the first set of metadata and the second set of metadata to provide mixed audio data. The processor outputs the mixed audio data as an audio output. The system includes a memory device coupled to the processor.

In an embodiment, a non-transitory computer-readable medium containing program instructions for modifying spatial audio is provided. Execution of the program instructions by one or more processors of a computer system causes the one or more processors to carry out multiple operations. The operations include obtaining a first set of metadata for a first set of audio data and a second set of metadata for a second set of audio data. The first and second sets of metadata and the first and second sets of audio data are associated with a display of a virtual scene. The operations further include encoding the first set of audio data to output a first soundfield and the second set of audio data to output a second soundfield. The operations also include mixing the first and second soundfields to output a mixed soundfield, decoding the mixed soundfield based on at least one of the first set of metadata and the second set of metadata to provide mixed audio data, and outputting the mixed audio data as an audio output.

Object-based audio tends to be difficult to work with because audio sources are not mixed together. Soundfield, such as multi-channel representations are ways of working with spatial audio, at a cost of reduced spatial resolution. Some advantages of the herein described system and methods for modifying spatial audio, described herein, include increasing the spatial resolution by applying the metadata during the decoding.

Other aspects of the present disclosure will become apparent from the following detailed description, taken in conjunction with the accompanying drawings, illustrating by way of example the principles of embodiments described in the present disclosure.

BRIEF DESCRIPTION OF THE DRA WINGS

Various embodiments of the present disclosure are best understood by reference to the following description taken in conjunction with the accompanying drawings in which:

FIG. 1A is a diagram of an embodiment of a system to illustrate a virtual scene of a video game.

FIG. 1B is a diagram of an embodiment of a system to illustrate that one or more sounds within a mixture of sounds is modified to output a modified mixture of sounds.

DETAILED DESCRIPTION

Figure 2:
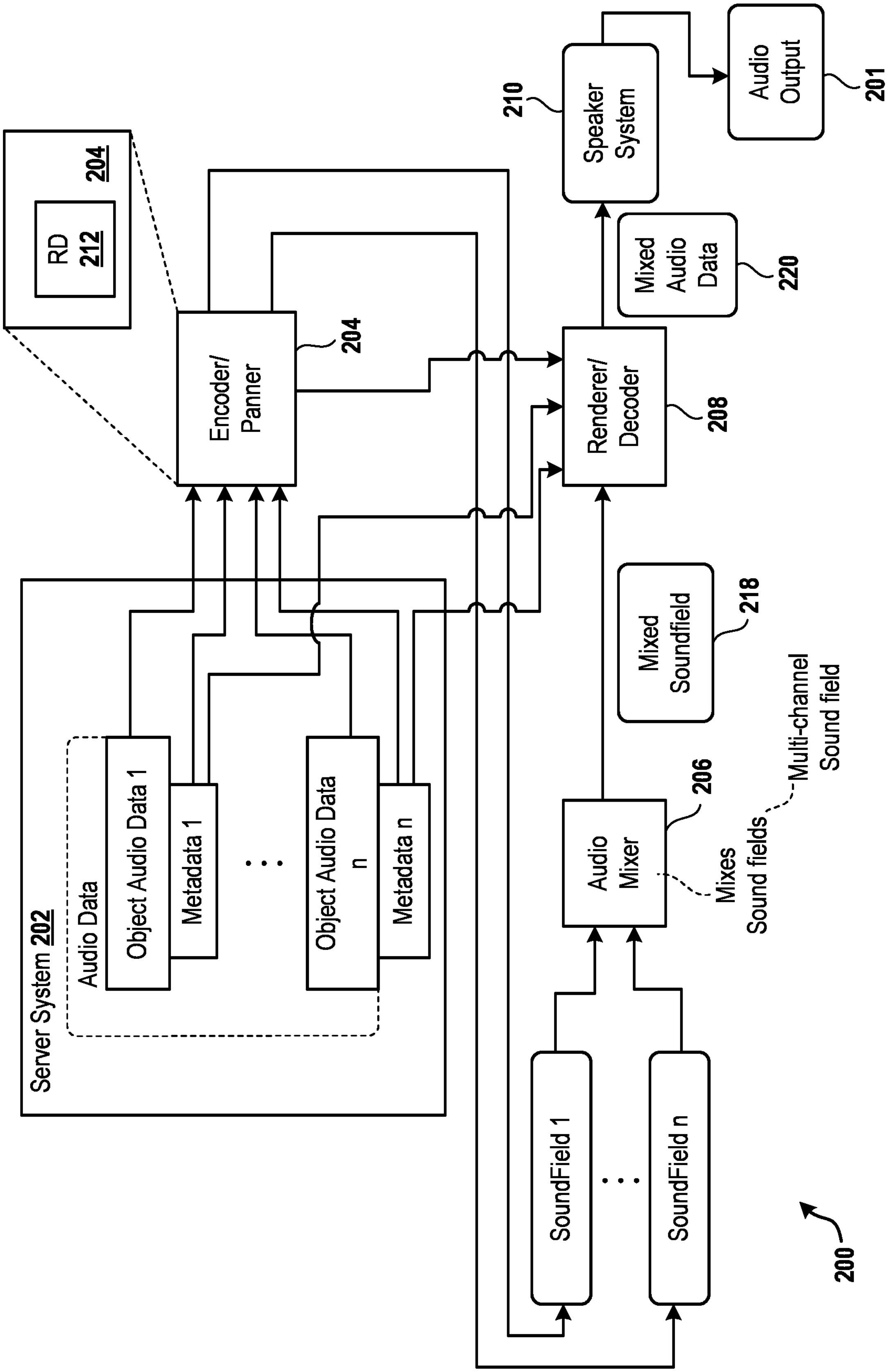
FIG. 2 is a diagram of an embodiment of a system for generating an audio output.

Systems and methods for modifying spatial audio are described. It should be noted that various embodiments of the present disclosure are practiced without some or all of these specific details. In other instances, well known process operations have not been described in detail in order not to unnecessarily obscure various embodiments of the present disclosure.

FIG. 1A is a diagram of an embodiment of a system 100 to illustrate a virtual scene 102 of a video game. The system 100 includes a display device 104 and a hand-held controller 106, which is operated by a user 1. An example of the display device 104 includes a display device of a television, such as a smart television. As an example, instead of the display device 104, a display device of a desktop computer, a display device of a laptop computer, a display device of a smart phone, a display device of a tablet, or a display device of a head-mounted display (HMD) is used. Illustrations of a display device, as used herein, include a light emitting diode (LED) display device, a plasma display device, and a liquid crystal display (LCD) device.

Examples of the hand-held controller 106 include a Sony™ PS5™ controller. As an example, instead of the hand-held controller 106, a hand-held controller that is held in one hand of the user 1 instead of two hands, or a keyboard, or a mouse, or stylus, touch screen or another input device is used.

The user 1 uses the hand-held controller 106 to log into a user account 1 assigned to the user 1 by a server system, which is described below. After the user 1 logs into the user account 1, the server system executes a game application to generate image frames and audio frames of the virtual scene 102, and sends the image frames and the audio frames via a computer network, such as the Internet or an Intranet or a combination thereof, to a client device. For example, the server system executes the game application to determine a shape and a position and orientation of each virtual object in the virtual scene 102, object audio data to be output with a display of the virtual object, and to assign graphical parameters, such as graphics, to the virtual object. In the example, the shape, the position and orientation, the graphical parameters, frequency data identifying one or more frequencies of the audio data output from the virtual object, angular spread of the object audio data, amplitude data, such as volume data, of the object audio data, and an identity (ID), such as alphanumeric characters, of the virtual object are illustrations of metadata regarding the virtual object, and the identity is assigned to the virtual object by one or more processors of the server system. Further, in the example, the one or more processors of the server system store the metadata within one or more memory devices of the server system. Illustrations of the graphics include color, intensity or shade, and texture. In the example, after the graphical parameters are assigned, the server system generates the image frames having the shape, the position and orientation, and the graphical parameters, and generates the audio frames having the object audio data.

In the example, the server system executes the game application to assign the object audio data, such as word data, or music data, or a combination thereof, to be output from each virtual object in the virtual scene 102 to generate the audio frames. In the example, the audio frames include the object audio data. Further, in the example, the frequency data provides one or more frequencies of emission of sound generated from the object audio data. In the example, the amplitude data is the volume data, such as magnitudes of sound to be generated from the object audio data. Also, in the example, the metadata includes the object audio data and the identifier of the virtual object to output the object audio data as sound.

Examples of the client device include a display device, described herein. To illustrate, the client device includes the display device 104 and the hand-held controller 106. As another illustration, the client device includes a game console, the hand-held controller 106, and the display device 104. As yet another illustration, the client device includes a display device and a hand-held controller.

As used herein, a processor is an application specific integrated circuit (ASIC), or a programmable logic device (PLD), or a central processing unit (CPU), or a graphical processing unit (GPU), or a field programmable gate array (FPGA), or a microcontroller, or a microprocessor. One or more ASICs, one or more PLDs, one or more CPUs, one or more GPUs, one or more FPGAs, one or more microcontrollers, and one or more microprocessors are examples of hardware. Moreover, examples of a memory device include a random access memory (RAM) and a read-only memory (ROM). To illustrate, the memory device is a redundant array of independent disks (RAID) or a flash memory.

The virtual scene 102 includes a virtual object 108, another virtual object 110, and yet another virtual object 112. The virtual object 108 is a virtual bird that is flying in a virtual sky, the virtual object 110 is a virtual car that is driven by a virtual user on a virtual road, and the virtual object 112 is a range of virtual mountains from which a virtual sun arises. It should be noted that the virtual user, the virtual road, and the virtual sun are examples of virtual objects. Moreover, it should be noted that the virtual mountains and the virtual sun form a part of a virtual background of the virtual scene 102.

One or more processors of the client device receive the image frames and the audio frames of the virtual scene 102 via the computer network, provide the image frames to the display device 104, and provide the audio frames to one or more speakers of the client device. The one or more processors of the client device processes the image frames of the virtual scene 102 to display, on the display device 104, each virtual object of the virtual scene 102 at its respective position and orientation in the virtual scene 102 and having its respective shape and respective graphical parameters. For example, the one or more processors display the virtual object 108 at a first position and having a first orientation in the virtual scene 102, and also as having a first shape and a first set of graphical parameters. In the example, the first position, a first identifier of the virtual object 108, the first orientation, the first shape, and the first set of graphical parameters is sometimes referred to herein as metadata 1. Also, in the example, the one or more processors display the virtual object 110 at a second position and having a second orientation in the virtual scene 102, and also as having a second shape and a second set of graphical parameters. In the example, the second position, a second identifier of the virtual object 110, the second orientation, the second shape, and the second set of graphical parameters is sometimes referred to herein as metadata n, where n is a positive integer. Further in the example, the virtual object 108 is sometimes referred to herein as a sound source 1 and the virtual object 110 is sometimes referred to herein as a sound source n. In the example, sound sources 2 through (n−1) are remaining virtual objects, such as the virtual user, in the virtual scene 102.

During a time period in which the display device 104 displays the virtual scene 102, the one or more processors of the client device control one or more speakers of the client device to output a mixture of sounds, which include a sound 114, such as soft chirping, output from the virtual object 108. The sound 114 is generated by the client device based on object audio data 1 assigned to the sound source 1 by the one or more processors of the server system. For example, the one or more speakers of the client device convert the object audio data 1 from an electronic signal, such as a digital signal or digital data, to the sound 114, which is an analog form, such as sound waves of vibrations traveling through air. Also, the mixture of sounds includes another sound 116, such as a car engine sound, emitted from the virtual object 110. The sound 116 is generated by the client device based on object audio data n assigned to the sound source 1 by the one or more processors of the server system. For example, the one or more speakers of the client device convert the object audio data n from an electronic signal to the sound 116, such as sound waves of vibrations traveling through air. The mixture of sounds further include any sound uttered by the virtual user in the virtual object 110. For example, the one or more processors of the client device control the one or more speakers to output sound 114, the sound 116, and the sound emitted by the virtual user simultaneously.

FIG. 1B is a diagram of an embodiment of a system 150 to illustrate that one or more of the sound 114, the sound 116, and the sound emitted by the virtual user within the mixture of sounds is modified to output a modified mixture of sounds. The system 150 includes the display device 104 and the hand-held controller 106.

The display device 152 displays a virtual scene 152. For example, after the user 1 uses the hand-held controller 106 to interact with the virtual scene 102 (FIG. 1A) and logs out of the user account 1, the user 1 uses the hand-held controller 106 to log back into the user account 1 to enable the client device to access the virtual scene 152. In the example, the virtual scene 152 is the same as the virtual scene 102 except that in the virtual scene 152, the virtual object 108 utters a different sound 154, such as loud chirping, compared to that uttered in the virtual scene 102. Further in the example, the virtual object 110 utters the same sound in the virtual scene 152 as that uttered by the virtual object 110 in the virtual scene 102. Also, in the example, the virtual user utters the same sound in the virtual scene 152 as that uttered by the virtual user in the virtual scene 102.

The one or more processors of the server system or the one or more processors of the client device modify the mixture of sounds output from the virtual scene 102 to provide the modified mixture of sounds output from the virtual scene 152. For example, the one or more processors of the server system or the one or more processors of the client device modify a soundfield, such as multiple pressure values in a three-dimensional (3D) space, to be output from the virtual object 108 as sound to output the modified mixture of sounds.

In one embodiment, one or more of the virtual object 108, the virtual object 110, and the virtual user utters a different sound in the virtual scene 152 that that uttered in the virtual scene 102. For example, the virtual object 110 utters a different sound in the virtual scene 152 than that uttered in the virtual scene 102. As another example, the virtual user utters a different sound in the virtual scene and that uttered in the virtual scene 150.

FIG. 2 is a diagram of an embodiment of a system 200 for generating an audio output 201. The system 200 includes a server system 202, an encoder 204, an audio mixer 206, a decoder 208, and a speaker system 210. The server system 202 includes one or more servers that are coupled to each other. Each of the servers includes a processor and a memory device. The processor is coupled to the memory device.

As an example, each of the encoder 204, the audio mixer 206, and the decoder 208 is implemented in hardware or software or a combination thereof. To illustrate, each of the encoder 204, the audio mixer 206, and the decoder 208 is a portion of a computer program that is executed by one or more processors, described herein. As another illustration, each of the encoder 204, the audio mixer 206, and the decoder 208 is implemented within an FPGA. To further illustrate, the encoder 204 is implemented within a first FPGA, the audio mixer 206 is implemented within a second FPGA, and the decoder 208 is implemented within a third FPGA. As another illustration, each of the encoder 204, the audio mixer 206, and the decoder 208 is a computer program that is executed by one or more processors. To further illustrate, the encoder 204 is a first computer program, the audio mixer 206 is a second computer program, and the decoder 208 is the third computer program. An example of the speaker system 210 includes one or more speakers.

As an another example, the encoder 204 and the audio mixer 206 are components of the server system 202 and the decoder 208 and the speaker system 210 are components of the client device. To illustrate, the server system 202 is coupled to the client device via the computer network. As another example, each of the encoder 204, the audio mixer 206, the decoder 208, and the speaker system 210 is implemented within the client device. To illustrate, the encoder 204, the audio mixer 206, the decoder 208, and the speaker system 210 are coupled to the server system 202 via the computer network. As yet another example, each of the encoder 204, the audio mixer 206, and the decoder 208, is implemented within the server system 202. To illustrate, each of the encoder 204, the audio mixer 206, the decoder 208, and the speaker system 210 is coupled to the client device via the computer network.

The server system 202 is coupled to the encoder 204. The encoder 204 is coupled to the audio mixer 206, which is coupled to the decoder 208. The decoder 208 is coupled to the speaker system 210.

The encoder 204, which is sometimes referred to herein as a panner, includes a request device (RD) 212. The RD 212 is implemented as software or hardware or a combination thereof. The RD 212 is coupled to the server system 202 and to the audio mixer 206.

The RD 212 requests object audio data 1 through object audio data n and metadata 1 through metadata n for all sounds that are emitted, such as uttered, by all the virtual objects and the virtual background of the virtual scene 102 (FIG. 1A) from the server system 202, and in response to the request, receives the object audio data 1 through n and the metadata 1 through n. As an example, when the RD 212 is coupled to the server system 202 via the computer network, a network interface controller (NIC) of the encoder 204 applies a network communication protocol, such as a transmission control protocol over Internet protocol (TCP/IP), to generate one or more communication packets including a request for the object audio data 1 through the object audio data n and the metadata 1 through the metadata n associated with, such as having a unique relationship with or linked with, the virtual scene 102, and sends the one or more communication packets via the computer network to the server system 202. To illustrate, the object audio data 1 through n is output as sound with a display of the virtual scene 102 to be associated with the virtual scene 102. Moreover, in the illustration, the server system 202 generates the metadata 1 based on the audio data 1 and the metadata n based on the audio data n to associate the metadata 1 with the audio data 1 and the metadata n with the audio data n.

In the example, one or more processors of the RD 212 generate the request in response to a user input received from a user via an input device that is coupled to the one or more processors of the RD 212. In the example, the user input is received during or within a predetermined time period from a display of the virtual scene 102. In the example, the user input indicates the virtual scene 102 to identify the virtual scene 102 based on which the methods, described herein, are to be executed. Further in the example, upon receiving the user input identifying the virtual scene 102, the one or more processors of the RD 212 accesses an identifier, such as an alphanumeric identifier, of the virtual scene 102 from one or more memory devices of the RD 212 and generates the request including the identifier of the virtual scene 102. In the example, upon receiving the one or more communication packets having the request, a NIC of the server system 202 applies the network communication protocol to extract the request from the one or more communication packets and sends the request to the one or more processors of the server system 202. In the example, the one or more processors of the server system 202 are coupled to the NIC of the server system 202.

Further, in the example, upon receiving the request, the one or more processors of the server system 202 obtain the identifier of the virtual scene 102 from the request, and identify the virtual scene 102 from the identifier. In the example, upon identifying the virtual scene 102, the one or more processors of the server system 202 access the audio data 1 through n and the metadata 1 through n associated with the virtual scene 102 from the one or more memory devices of the server system 202 and generate a reply including the audio data 1 through n and the metadata 1 through n. In the example, the one or more processors the server system 202 provide the reply having the audio data 1 through n and the metadata 1 through n to the NIC of the server system 202, and the NIC applies the network communication protocol to embed the reply in one or more communication packets. Further in the example, the NIC of the server system 202 sends the one or more communication packets via the computer network to the RD 212. In the example, the NIC of the RD 212 applies the network communication protocol to the one or more communication packets to obtain the audio data 1 through n and the metadata 1 through n from the one or more communication packets, and provides the audio data 1 through n and the metadata 1 through n to the one or more processors of the RD 212.

As another example, when the RD 212 is locally coupled to the server system 202, such as not coupled to the server system 202 via the computer network, the RD 212 generates the request in the same manner as that in the preceding example except that there is no use of the network communication protocol, and sends the request to the one or more processors of the server system 202. Further, in the example, the one or more processors of the server system 202 generate the reply in response to the request and send the reply to the one or more processors of the RD 212 in the same manner as that described in the preceding example except that there is no use of the network communication protocol.

Examples of an input device, as used herein, include a hand-held controller, a keyboard, a stylus, a mouse, a touchpad, and a touchscreen. Moreover, examples of a user input, as described herein, include one or more selections of one or more buttons of the input device.

One or more processors of the encoder 204 receive the audio data 1 through n and the metadata 1 through n from the one or more processors of the RD 212, encode each of the object audio data 1 through n of the virtual scene 102 to output multiple soundfields, such as a soundfield 1 through a soundfield n, of the virtual scene 102, and assign at least a portion of the metadata 1 to the soundfield 1, and at least a portion of the metadata n to the soundfield n. For example, the one or more processors of the encoder 204 convert the object audio data 1 into the soundfield 1 based on the metadata 1 and convert the object audio data n into the soundfield n based on the metadata n. As an illustration, the one or more processors of the encoder 204 convert the object audio data 1 into a set of speaker channels, such as a speaker bed. In the illustration, the one or more processors of the encoder 204 determine a set of weights for each one of the speaker channels to distribute the object audio data 1 into the speaker channels. To further illustrate, the one or more processors of the encoder 204 assigns a first set of weights, determined based on the metadata 1, to a first portion of the audio data 1 to output a first speaker channel. In the further illustration, the one or more processors of the encoder 204 assigns a second set of weights, determined based on the metadata 1, to a second portion of the audio data 1 to output a second speaker channel. In the illustration, the first and second weights are determined by the one or more processors of the encoder 204. In the illustration, the first set of weights is the same as or different from the second set of weights. In the illustration, the first and second speaker channels are examples of the soundfield 1. As another illustration, the one or more processors of the encoder 204 convert the object audio data n into a set of speaker channels, such as a speaker bed. In the illustration, the one or more processors of the encoder 204 determine a set of weights for each one of the speaker channels to distribute the object audio data n into the speaker channels. To further illustrate, the one or more processors of the encoder 204 assigns a primary set of weights, determined based on the metadata n, to a first portion of the audio data n to output a primary speaker channel. In the further illustration, the one or more processors of the encoder 204 assigns a secondary set of weights, determined based on the metadata n, to a second portion of the audio data n to output a secondary speaker channel. In the illustration, the primary and secondary weights are determined by the one or more processors of the encoder 204. In the illustration, the primary set of weights is the same as or different from the secondary set of weights. In the illustration, the primary and secondary speaker channels are examples of the soundfield n.

As yet another illustration, the one or more processors of the encoder 204 convert the object audio data 1 into a first Ambisonics soundfield, such as a first multichannel spherical harmonics representation, which is implicitly independent of a position and orientation 1 of the sound source 1. In the illustration, the one or more processors of the encoder 204 convert the object audio data n into a second Ambisonics soundfield, such as a second multichannel spherical harmonics representation, which is implicitly independent of a position and orientation n of the sound source n. In the illustration, the first Ambisonics soundfield is an example of the soundfield 1 and the second Ambisonics soundfield is an example of the soundfield n.

As still another illustration, the one or more processors of the encoder 204 generate a first virtual point source in the 3D space, such as a 3D graph, to represent a location of the virtual object 108 in the virtual scene 102 and generate a second virtual point source in the 3D graph to represent a location of the virtual object 110 in the virtual scene 102. In the illustration, a distance between the first virtual point source and the second virtual point source is proportional to a distance between the virtual objects 108 and 110. Further, in the illustration, a direction in which the second virtual point source is located with respect to the first virtual point source in the 3D graph is similar to, such as the same as, a direction in which the virtual object 110 is located with respect to the virtual object 108 in the virtual scene 102.

Further, in the illustration, the one or more processors of the encoder 204 generate a first set of pressure points, such as a first set of pressure values, emanating from the first virtual point source to create a 3D volume in the 3D graph to represent the metadata 1 and the audio data 1. To further illustrate, upon determining that a first portion of the amplitude data of the object audio data 1 is greater than a second portion of the amplitude data of the object audio data 1, the one or more processors of the encoder 204 generate, in the 3D graph, a portion of the first set of pressure points corresponding to the first portion of the amplitude data of the audio data 1 to be further away from the first virtual point source. In the further illustration, the portion of the first set of pressure points is further away compared to another portion of the first set of pressure points corresponding to the second portion of the amplitude data of the object audio data 1. As another further illustration, the one or more processors of the encoder 204 generate an angular spread of the first set of pressure points in the 3D graph based on the angular spread of the object audio data 1. In the further illustration, the angular spread of the first set of pressure points is proportional to, such as equal to, the angular spread of the object audio data 1. Also, in the further illustration, the angular spread of the first set of pressure points with respect to the first virtual point source is in a similar direction, such as in the same direction, as that of a direction of the angular spread of the object audio data 1 with respect to the virtual object 108.

Also, in the illustration, the one or more processors of the encoder 204 generate, in the 3D graph, a second set of pressure points, such as a second set of pressure values, emanating from the second virtual point source to represent the metadata n and the object audio data n. To further illustrate, upon determining that a first portion of the amplitude data of the object audio data n is greater than a second portion of the amplitude data, the one or more processors of the encoder 204 generate a portion of the second set of pressure points corresponding to the first portion of the amplitude data of the object audio data n to be further away from the second virtual point source. In the further illustration, the portion of the second set of pressure points is further away compared to another portion of the second set of pressure points corresponding to the second portion of the amplitude data of the object audio data n. As another further illustration, the one or more processors of the encoder 204 generate an angular spread of the second set of pressure points in the 3D graph based on the angular spread of the object audio data n. In the further illustration, the angular spread of the second set of pressure points is proportional to, such as equal to, the angular spread of the object audio data n. Also, in the further illustration, the angular spread of the second set of pressure points with respect to the second virtual point source is in a similar direction, such as in the same direction, as that of a direction of the angular spread of the object audio data n with respect to the virtual object 110.

In the illustration, the first set of pressure points is an example of the soundfield 1 and the second set of pressure points is an example of the soundfield n. In the illustration, the one or more processors of the encoder 204 assign a source identity 1, such as alphanumeric characters, identifying the sound source 1, to each of pressure points of the first set, and assign a source identity n, such as alphanumeric characters, identifying the sound source n, to each of pressure points of the second set. To further illustration, the one or more processors of the encoder 204 associate, such as establish a one-to-one relationship or a link between, the source identity 1 and each of the pressure points of the first set and associate, such as establish a one-to-one relationship or a link between, the source identity n and each of the pressure points of the second set.

The one or more processors of the encoder 204 provides the soundfields 1 through n with at least a portion of the metadata 1 through at least a portion of the metadata n to the audio mixer 206. Upon receiving the soundfields 1 through n, the audio mixer 206 mixes the soundfields 1 through n to output a mixed soundfield 218, which is sometimes referred to herein as a multi-channel soundfield. Moreover, the audio mixer 206, leaves in, the assignment of at least a portion of the metadata 1 with the soundfield 1 and leaves in the assignment of at least a portion of the metadata n with the soundfield n. For example, the audio mixer 206 adds the first speaker channel to the primary speaker channel to output a first added speaker channel and adds the second speaker channel to the secondary speaker channel to output a second added speaker channel. In the example, the audio mixer 206 maintains, during and after the addition, the first set of weights used to generate the first speaker channel, the second sets of weights used to generate the second speaker channel, the primary set of weights used to generate the primary speaker channel and the secondary set of weights used to generated the secondary speaker channel. To illustrate, the first set of weights points to a portion of the first added speaker channel and the primary set of weights points to a remaining portion of the first added speaker channel. In the illustration, the second set of weights points to a portion of the second added speaker channel and the secondary set of weights points to a remaining portion of the second added speaker channel. In the example, the first added speaker channel and the second added speaker channel are examples of the mixed soundfield 218.

As another example, upon determining that an angular spread of a first portion of the first set of pressure points intersects with an angular spread of a first portion the second set of pressure points in the 3D graph, the audio mixer 206 combines the first portions by adding the first portions. In the example, a remaining portion of the first set and a remaining portion of the second set are not combined. In the example, the first portions are combined to generate a combined portion, and the remaining portions and the combined portion represent the mixed soundfield 218. In the example, the audio mixer 206 leaves in, such as does not remove, within the combined portion, the assignment of at least a portion of the metadata 1, such as the source identity 1, to the first portion of the first set of pressure points and leaves in the assignment of at least a portion of the metadata n, such as the source identity n, to the first portion of the second set of pressure points. Also, in the example, the audio mixer 206 leaves in, such as does not remove, the assignment of at least a portion of the metadata 1, such as the source identity 1, to the remaining portion of the first set and the assignment of at least a portion of the metadata n, such as the source identity n, to the remaining portion of the second set. The audio mixer 206 provides the mixed soundfield 218 to the decoder 208.

Upon receiving the mixed soundfield 218, the decoder 208 decodes the mixed soundfield 218 based on one or more of the metadata 1 through n within the mixed soundfield 218 to generate the mixed audio data 220. For example, the decoder 208 modifies the first added speaker channel or the second added speaker channel or a combination thereof to generate the mixed audio data 220. To illustrate, the decoder 208 modifies, such as increases or decreases, an amplitude or a frequency or a combination thereof, of the first added speaker channel to output an adjusted mixed soundfield. In the illustration, during and after the modification, the decoder 208 maintains the first and primary sets of weights assigned to the first added speaker channel. As another illustration, the decoder 208 modifies, such as increases or decreases, an amplitude or a frequency or a combination thereof, of the second added speaker channel to output an adjusted mixed soundfield. In the illustration, during and after the modification, the decoder 208 maintains the second and secondary sets of weights assigned to the second added speaker channel. As yet another illustration, the decoder 208 modifies, such as increases or decreases, amplitudes or frequencies or a combination thereof, of the first and second added speaker channels to output an adjusted mixed soundfield. In the illustration, during and after the modification, the decoder 208 maintains the first and primary sets of weights assigned to the first added speaker channel, and the second and secondary sets of weights assigned to the second added speaker channel.

In the example, a decoding circuit of the decoder 208 applies an inverted process compared to the process applied by the encoder 204 to convert the adjusted mixed soundfield to mixed audio data. To illustrate, the decoding circuit determines, based on the first and second sets of weights, assigned to a first set of portions of the adjusted mixed soundfield that the first set of portions are of audio data to be output from the sound source 1 and determines, based on the primary and second sets of weights, assigned to a second set of portions of the adjusted mixed soundfield that the second set of portions are of audio data to be output from the sound source n. In the illustration, the decoder provides the audio data to be output from the sound source 1 and the audio data to be output from the sound source n as the mixed audio data to be simultaneously output from the sound sources 1 and n.

Additional examples of decoding, such as modification, by the decoder 208 are provided below. The decoder 208 provides the mixed audio data 220 to the speaker system 210. The speaker system 210 converts the mixed audio data 220 from a digital form, such as a form of an electronic signal, to generate the audio output 201. An example of the audio output 201 is sound that is output with the virtual scene 150 (FIG. 1B).

Figure 3:
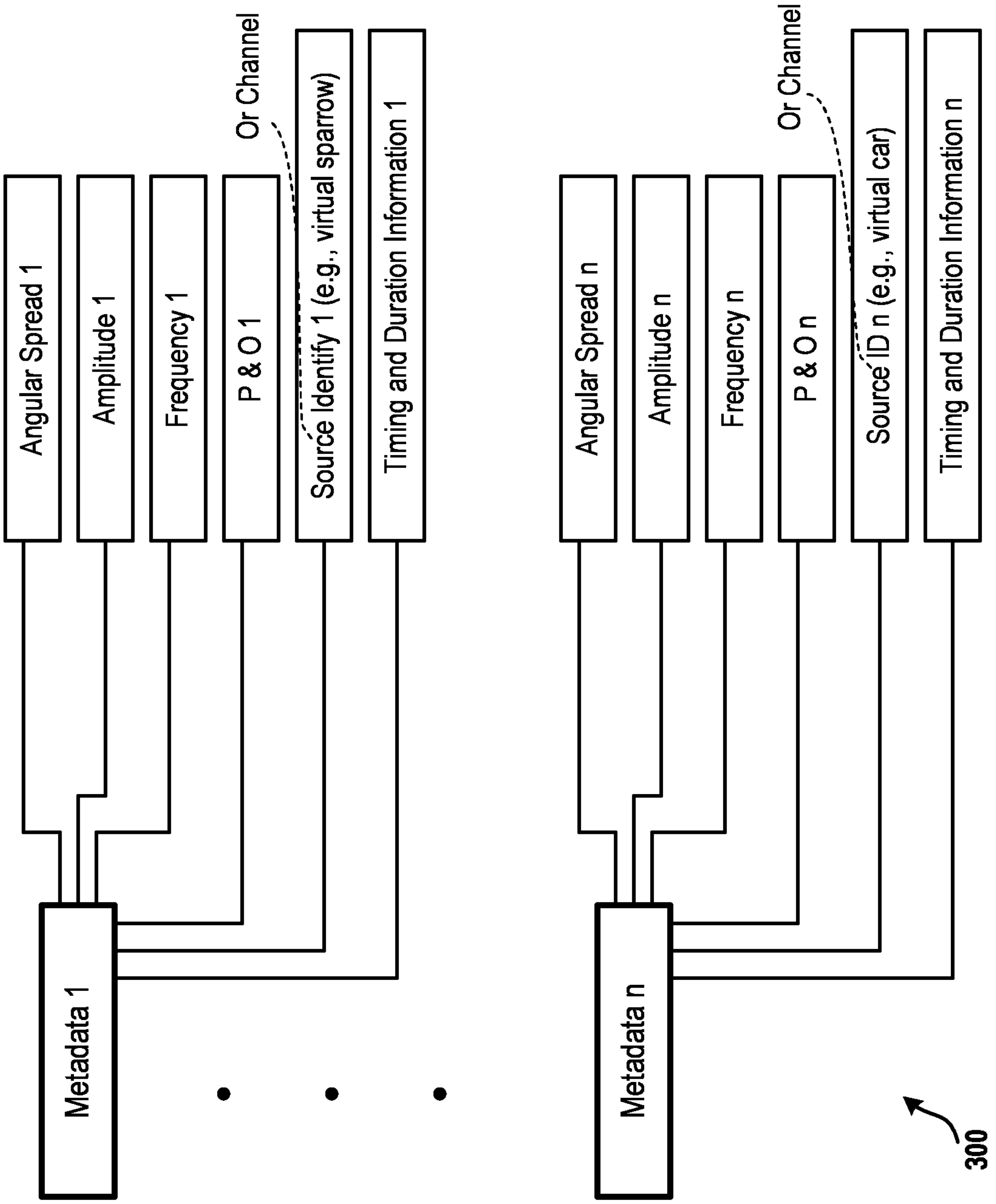
FIG. 3 is a diagram of an embodiment of a system to provide examples of metadata.

FIG. 3 is a diagram of an embodiment of a system 300 to provide examples of the metadata 1 through n. An example of the metadata 1 includes an angular spread 1 of the object audio data 1. To illustrate, the angular spread 1 represents a region within the virtual scene 102 (FIG. 1A) across which the sound 114 is output from the virtual object 108 (FIG. 1A). An angular spread is sometimes referred to herein as directionality of sound in a virtual scene. Another example of the metadata 1 includes the amplitude data, such as one or more levels having one or more values of amplitudes of the object audio data 1. Yet another example of the metadata 1 includes the frequency data having values of frequencies of the object audio data 1. Another example of the metadata 1 includes the position and orientation (P & O) 1 of the virtual object 108 in the virtual scene 102. To illustrate, the position of the position and orientation 1 includes a location, such as a 3D location, of the virtual object 108 with respect to a reference coordinate, such as (0, 0, 0), of a corner of the virtual scene 102. In the illustration, the 3D location is an (x1, y1, z1) location with respect to the reference coordinate along an x-axis, a y-axis, and a z-axis at the reference coordinate of the virtual scene 102. Further, in the illustration, the x, y, and z axes intersect each other at the reference coordinate. Also in the illustration, the orientation of the position and orientation 1 includes angles, such as (θ1, ϕ1, γ1) of the virtual object 108 with respect to an x-axis, a y-axis, and a z-axis at the position of the position and orientation 1. An example of the metadata 1 includes the source identity 1 identifying the sound source 1. Another example of the metadata 1 includes timing and duration information 1, such as an amount of time or a period of time, for which the sound source 1 emits the sound 114 (FIG. 1A), a timestamp onset for start of emission of the sound 114, and a timestamp end of end the emission of the sound 114.

An example of the metadata n includes an angular spread n of the object audio data n. To illustrate, the angular spread n represents a region within the virtual scene 102 across which the sound 116 is output from the virtual object 110 (FIG. 1A). Another example of the metadata n includes the amplitude data, such as one or more levels having one or more values of amplitudes of the object audio data n. Yet another example of the metadata n includes the frequency data having values of frequencies of the object audio data n. Another example of the metadata n includes the position and orientation (P & O) n of the virtual object 110 in the virtual scene 102. To illustrate, the position of the position and orientation n includes a location, such as a 3D location, of the virtual object 110 with respect to the reference coordinate of the corner of the virtual scene 102. In the illustration, the 3D location is an (xn, yn, zn) location with respect to the reference coordinate along the x-axis, the y-axis, and the z-axis at the reference coordinate of the virtual scene 102. Also in the illustration, the orientation of the position and orientation n includes angles, such as (θn, ϕn, γn) of the virtual object 110 with respect to an x-axis, a y-axis, and a z-axis at the position of the position and orientation n. An example of the metadata n includes the source identity n identifying the sound source n. Another example of the metadata n includes a timing and duration n, such as an amount of time or a period of time, for which the sound source n emits the sound 116 (FIG. 1A), a timestamp onset for start of emission of the sound 116, and a timestamp end of end the emission of the sound 116.

Figure 4:
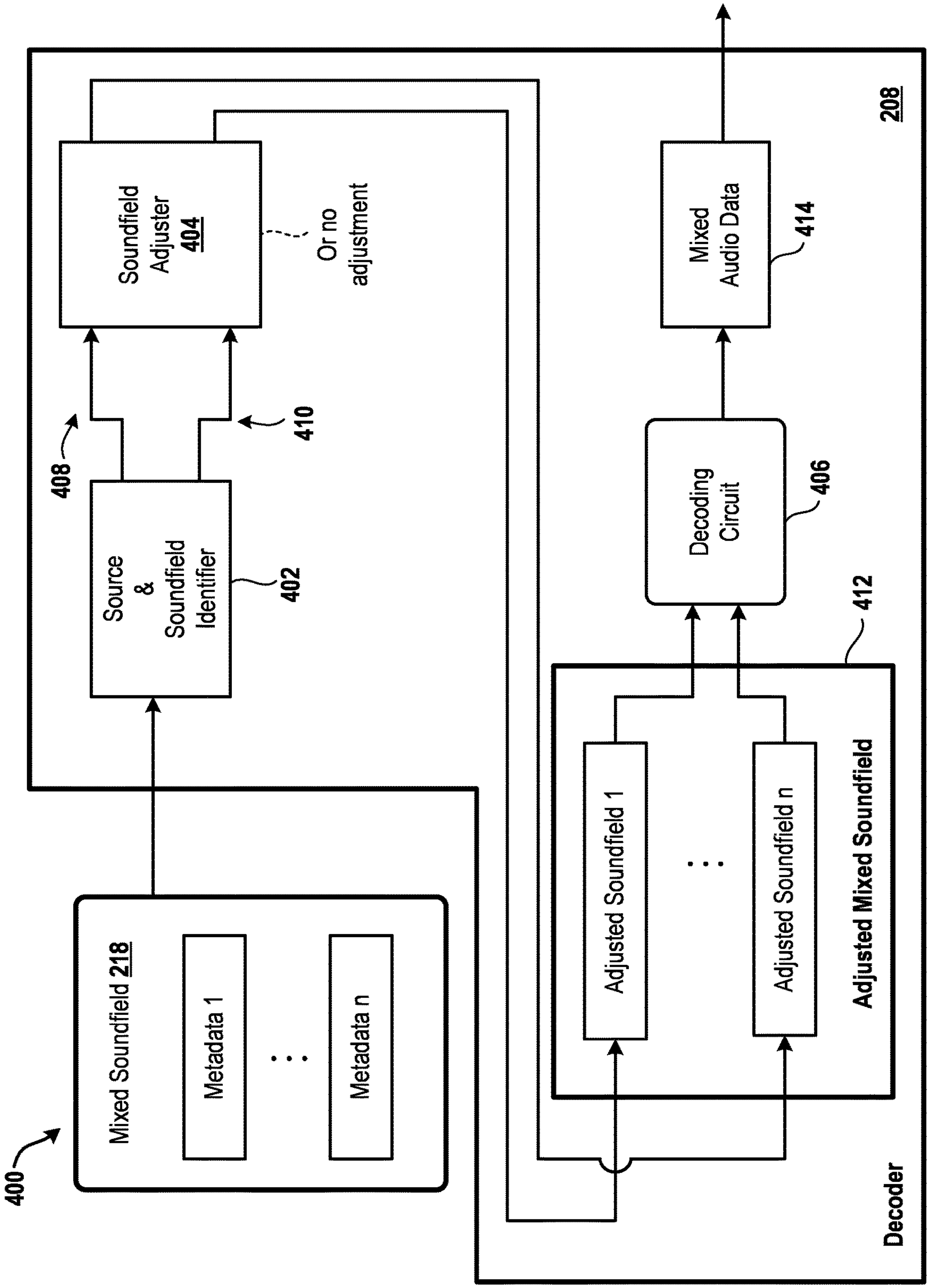
FIG. 4 is a diagram of an embodiment of a system to illustrate a manner in which a mixed soundfield is decoded by a decoder.

FIG. 4 is a diagram of an embodiment of a system 400 to illustrate a manner in which the mixed soundfield 218 is decoded by the decoder 208. The system 400 includes the decoder 208. The decoder 208 includes a source and soundfield identifier 402, a soundfield adjuster 404, and a decoding circuit 406. Each of the source and soundfield identifier 402, the soundfield adjuster 404, and the decoding circuit 406 is implemented as hardware or software or a combination thereof. For example, the source and soundfield identifier 402 is a first FPGA, the soundfield adjuster 404 is a second FPGA, and the decoding circuit 406 is a third FPGA.

As another example, each of the source and soundfield identifier 402, the soundfield adjuster 404, and the decoding circuit 406 is a computer program or a portion of a computer program. To illustrate, the source and soundfield identifier 402 is a first computer program, the soundfield adjuster 404 is a second computer program, and the decoding circuit 406 is a third computer program. As another illustration, the source and soundfield identifier 402 is a first portion of a computer program, the soundfield adjuster 404 is a second portion of the computer program, and the decoding circuit 406 is a third portion of the computer program.

The source and soundfield identifier 402 is coupled to the soundfield adjuster 404. Also, the soundfield adjuster 404 is coupled to the decoding circuit 406.

The source and soundfield identifier 402 identifies, within the mixed soundfield 218, the soundfield 1 and the soundfield n based on at least a portion of the metadata 1 and at least a portion of the metadata n. For example, the soundfield identifier 404 receives the mixed soundfield 218 having at least a portion of the metadata 1 and at least a portion of the metadata n, and parses the mixed soundfield 218 to identify the soundfield 1 based on at least the portion of the metadata 1 and the soundfield n based on at least the portion of the metadata n. To illustrate, the soundfield identifier 404 determines that the remaining portion of the first set of pressure points within the mixed soundfield 218 is identified by the source identity 1, determines that the remaining portion of the second set of pressure points within the mixed soundfield 218 is identified by the source identity n, determines that the first portion, within the combined portion, of the first set of pressure points within the mixed soundfield 218 is identified by the source identity 1, and determines that the first portion, within the combined portion, of the second set of pressure points within the mixed soundfield 218 is identified by the source identity n. In the illustration, the soundfield identifier 404 identifies the remaining portion of the first set of pressure points and the first portion of the first set of pressure points to be the soundfield 1 and identifies the remaining portion of the second set of pressure points and the second portion of the second set of pressure points to be the soundfield n.

The source and soundfield identifier 402 provides the mixed soundfield 218 in which the soundfields 1 through n are identified to the soundfield adjuster 404. The soundfield adjuster 404 adjusts one or more of the soundfields 1 through n within the mixed soundfield 218 to output an adjusted mixed soundfield 412. For example, the source and soundfield identifier 402 receives a user input via an input device, such as an input device of the client device, to adjust the soundfield 1 or receives a user input via the input device to adjust the soundfield n or a combination thereof. In the example, the source and soundfield identifier 402 is coupled to the input device. To illustrate, upon receiving the user input to adjust the soundfield 1 and not receiving the user input to adjust the soundfield n, the source and soundfield identifier 402 sends a soundfield adjustment signal 408 to the soundfield adjuster 404 and does not send a soundfield adjustment signal 410 to the soundfield adjuster 404. In the example, upon receiving the soundfield adjustment signal 408, the soundfield adjuster 404 adjusts the soundfield 1, such as the pressure points of the first and remaining portions of the first set, to generate an adjusted soundfield 1 within the mixed soundfield 218. The mixed soundfield 218 having the adjusted soundfield 1 is an example of the adjusted mixed soundfield 412. Also, in the example, upon not receiving the soundfield adjustment signal 410, the soundfield adjuster 404 does not adjust the soundfield n within the mixed soundfield 218.

Also, as another illustration, upon receiving the user input to adjust the soundfield n and not receiving the user input to adjust the soundfield 1, the source and soundfield identifier 402 sends the soundfield adjustment signal 410 to the soundfield adjuster 404 and does not send the soundfield adjustment signal 408 to the soundfield adjuster 404. In the example, upon receiving the soundfield adjustment signal 410, the soundfield adjuster 404 adjusts the soundfield n, such as the pressure points of the first and remaining portions of the second set, to generate an adjusted soundfield n within the mixed soundfield 218. The mixed soundfield 218 having the adjusted soundfield n is an example of the adjusted mixed soundfield 412. Also, in the example, upon not receiving the soundfield adjustment signal 408, the soundfield adjuster 404 does not adjust the soundfield 1 and the adjusted soundfield 1 is not generated within the mixed soundfield 218 by the soundfield adjuster 404.

To illustrate, the user input to adjust the soundfield 1 indicates to adjust, such as increase or decrease, the angular spread of the pressure points of the soundfield 1 to output a first set of adjusted pressure points or the user input to adjust the soundfield n indicates to adjust, such as increase or decrease, the angular spread of the pressure points of the soundfield n to output a second set of adjusted pressure points or a combination thereof. As another illustration, the user input to adjust the soundfield 1 indicates to adjust, such as extend or retract, in the 3D graph one or more pressure points of the first set of the soundfield 1 or the user input to adjust the soundfield n indicates to adjust, such as extend or retract, in the 3D graph one or more pressure points of the second set of the soundfield n. In the example, when the user input to adjust the soundfield 1 is not received, the soundfield 1 is not adjusted by the soundfield adjuster 404 and when the user input to adjust the soundfield n is not received, the soundfield n is not adjusted by the soundfield adjuster 404. As such, in the example, one or more of the soundfields 1 through n are adjusted within the mixed soundfield 218 but remaining ones of the soundfields 1 through n within the mixed soundfield 218 are not adjusted to output the adjusted mixed soundfield 412.

The soundfield adjuster 404 provides the adjusted mixed soundfield 412 to the decoding circuit 406. The decoding circuit 406 converts the adjusted mixed soundfield 412 to mixed audio data 414, which is an example of the mixed audio data 220 (FIG. 2). For example, the decoding circuit 406 applies an inverted process compared to the process applied by the encoder 204 to convert the adjusted mixed soundfield 412 to the mixed audio data 414. To illustrate, the decoding circuit 406 converts the first virtual point source, the second virtual point source, the first set of pressure points, and the second set of adjusted pressure points into the mixed audio data 414 to be output as the sound of the virtual scene 152 (FIG. 1B). To further illustrate, when a first pressure point of the second set of adjusted pressure points is away from the second virtual point source compared to a second pressure point of the second set of adjusted pressure points, the first pressure point is converted into a greater value of an amplitude of the mixed audio data 414 compared to the second pressure point. As another illustration, the decoding circuit 406 converts the first virtual point source, the second virtual point source, the first set of adjusted pressure points, and the second set of pressure points into the mixed audio data 414 to be output as the sound of the virtual scene 152. To further illustrate, when a first pressure point of the first set of adjusted pressure points is away from the first virtual point source compared to a second pressure point of the first set of adjusted pressure points, the first pressure point is converted into a greater value of an amplitude of the mixed audio data 414 compared to the second pressure point. As yet another illustration, the decoding circuit 406 converts the first virtual point source, the second virtual point source, the first set of adjusted pressure points, and the second set of adjusted pressure points into the mixed audio data 414 to be output as the sound of the virtual scene 152.

As another illustration, the decoding circuit 406 converts the angular spread of the first set of adjusted pressure points into an angular spread of a portion of the mixed audio data 414 to be output as sound from the virtual object 108. To further illustrate, the decoding circuit 406 generates the angular spread of the portion of the mixed audio data 414 to be proportional to, such as equal to or a fractional multiple of, the angular spread of the first set of adjusted pressure points.

As another illustration, the decoding circuit 406 converts the angular spread of the second set of adjusted pressure points into an angular spread of a portion of the mixed audio data 414 to be output as sound from the virtual object 108. To further illustrate, the decoding circuit 406 generates the angular spread of the portion of the mixed audio data 414 to be proportional to, such as equal to or a fractional multiple of, the angular spread of the second set of adjusted pressure points.

As yet another illustration, the decoding circuit 406 converts the first virtual point source into the location of the sound source 1 to be displayed as the virtual object 108 in the virtual scene 152 and converts the second virtual point source into the location of the sound source n to be displayed as the virtual object 110 in the virtual scene 152. The mixed audio data 414 includes amplitude data of sounds to be output from the virtual objects 108 and 110 in the virtual scene 152, frequency data of the sounds, locations of the sound sources 1 and n, and angular spreads of the sounds.

In an embodiment in which the decoder 208 is the component of the client device and the audio mixer 206 is the component of the server system 202 (FIG. 2), the audio mixer 206 include a NIC. The NIC of the audio mixer 206 receives the mixed soundfield 218 from one or more processors of the audio mixer 206, applies the network communication protocol to the mixed soundfield 218 to generate one or more communication packets, and sends the one or more communication packets via the computer network to the decoder 208. In the embodiment, the one or more processors of the audio mixer 206 generate the mixed soundfield 218 from the soundfields 1 through n in the same manner as that described above with reference to FIG. 2. The NIC of the audio mixer 206 is coupled to the one or more processors of the audio mixer 206. Moreover, in the embodiment, a NIC of the decoder 208 receives the one or more communication packets from the NIC of the audio mixer 206 and applies the network communication protocol to the one or more communication packets to extract the mixed soundfield 218 and provides the mixed soundfield 218 to one or more processors of the decoder 208. In the embodiment, the one or more processors of the decoder 208 generate the mixed audio data 414 from the mixed soundfield 218 in the manner described above with reference to FIG. 4. The NIC of the decoder 208 is coupled to the one or more processors of the decoder 208.

Figure 5:
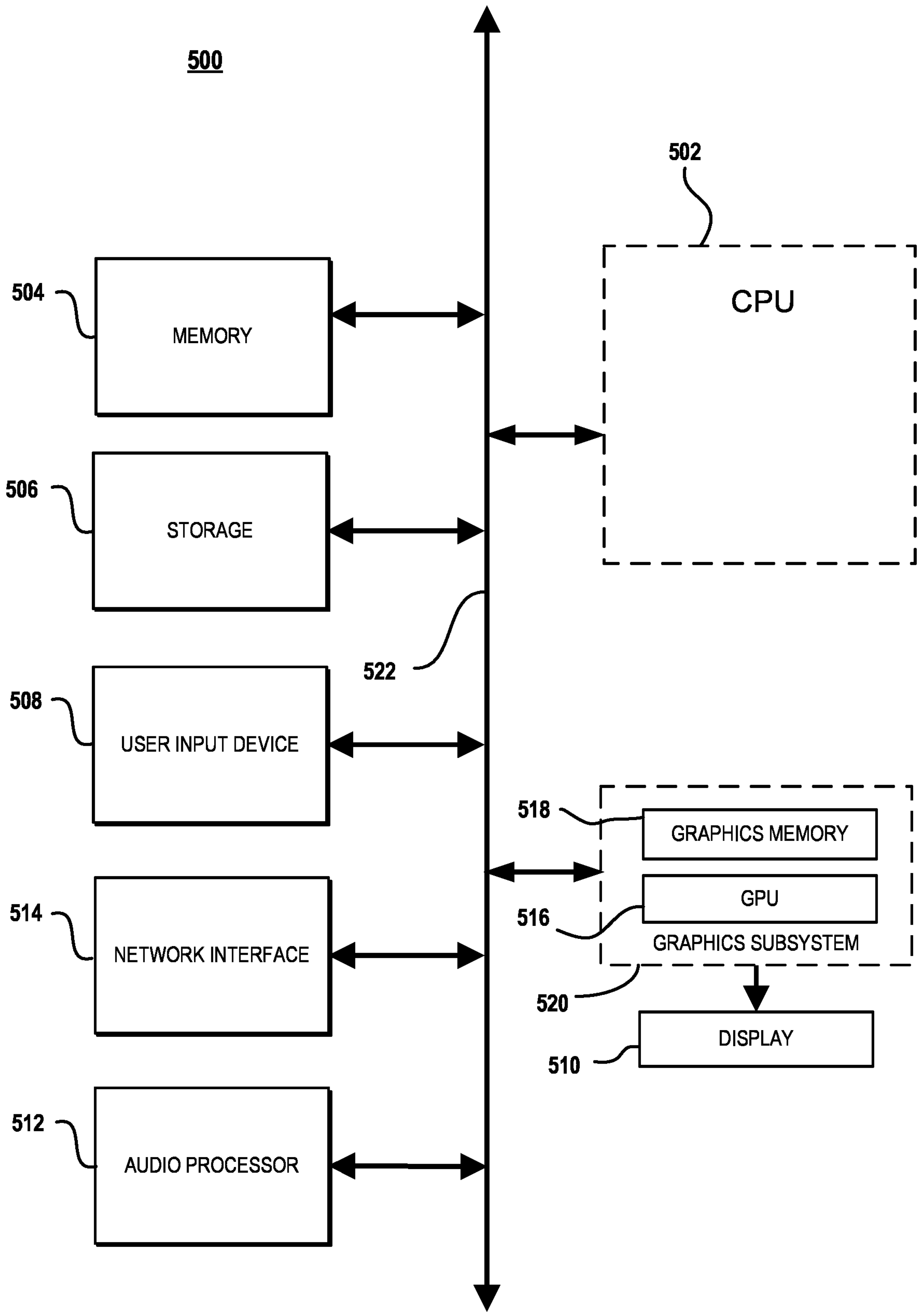
FIG. 5 illustrates components of an example device that can be used to perform aspects of the various embodiments of the present disclosure.

FIG. 5 illustrates components of an example device 500, such as a client device or a server system, that can be used to perform aspects of the various embodiments of the present disclosure. This block diagram illustrates the device 500 that can incorporate or can be a personal computer, a smart phone, a video game console, a personal digital assistant, a server or other digital device, suitable for practicing an embodiment of the disclosure. The device 500 includes a CPU 502 for running software applications and optionally an operating system. The CPU 502 includes one or more homogeneous or heterogeneous processing cores. For example, the CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 500 can be a localized to a player, such as a user, described herein, playing a game segment (e.g., game console), or remote from the player (e.g., back-end server processor), or one of many servers using virtualization in a game cloud system for remote streaming of gameplay to clients.

A memory 504 stores applications and data for use by the CPU 502. A storage 506 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 508 communicate user inputs from one or more users to the device 500. Examples of the user input devices 508 include keyboards, mouse, joysticks, touch pads, touch screens, still or video recorders/cameras, tracking devices for recognizing gestures, and/or microphones. A network interface 514 allows the device 500 to communicate with other computer systems via an electronic communications network, and may include wired or wireless communication over local area networks and wide area networks, such as the internet. An audio processor 512 is adapted to generate analog or digital audio output from instructions and/or data provided by the CPU 502, the memory 504, and/or data storage 506. The components of device 500, including the CPU 502, the memory 504, the data storage 506, the user input devices 508, the network interface 514, and an audio processor 512 are connected via a data bus 522.

A graphics subsystem 520 is further connected with the data bus 522 and the components of the device 500. The graphics subsystem 520 includes a graphics processing unit (GPU) 516 and a graphics memory 518. The graphics memory 518 includes a display memory (e.g., a frame buffer) used for storing pixel data for each pixel of an output image. The graphics memory 518 can be integrated in the same device as the GPU 516, connected as a separate device with the GPU 516, and/or implemented within the memory 504. Pixel data can be provided to the graphics memory 518 directly from the CPU 502. Alternatively, the CPU 502 provides the GPU 516 with data and/or instructions defining the desired output images, from which the GPU 516 generates the pixel data of one or more output images. The data and/or instructions defining the desired output images can be stored in the memory 504 and/or the graphics memory 518. In an embodiment, the GPU 516 includes three-dimensional (3D) rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from the graphics memory 518 to be displayed on the display device 510. The display device 510 can be any device capable of displaying visual information in response to a signal from the device 500, including a cathode ray tube (CRT) display, a liquid crystal display (LCD), a plasma display, and an organic light emitting diode (OLED) display. The device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first.

For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for modifying spatial audio, comprising:

obtaining a first set of metadata for a first set of audio data and a second set of metadata for a second set of audio data, wherein the first set of metadata, the second set of metadata, the first set of audio data, and the second set of audio data are associated with a display of a virtual scene;

encoding the first set of audio data to output a first soundfield and the second set of audio data to output a second soundfield;

mixing the first and second soundfields to output a mixed soundfield;

decoding the mixed soundfield based on at least one of the first set of metadata and the second set of metadata to provide mixed audio data, wherein decoding the mixed soundfield includes:

identifying from the mixed soundfield and the first set of metadata, a first sound source and a first soundfield output by the first sound source;

identifying from the mixed soundfield and the second set of metadata, a second sound source and a second soundfield output by the second sound source;

adjusting, within the mixed soundfield, the first soundfield based on the first set of metadata to provide a first adjusted soundfield without adjusting, within the mixed soundfield, the second soundfield, wherein the first soundfield is adjusted without adjusting the second soundfield to provide an adjusted mixed soundfield; and converting the adjusted mixed soundfield to the mixed audio data; and outputting the mixed audio data as an audio output.

2. The method of claim 1, wherein the mixed audio data has a different amplitude of sound output from the first sound source than an amplitude of sound output based on the first set of audio data, wherein the amplitude of sound output based on the first set of audio data is output from the first sound source, or wherein the mixed audio data has a different angular spread of sound output from the first sound source than an angular spread of sound output based on the first set of audio data, wherein the angular spread of sound output based on the first set of audio data is output from the first sound source, or a combination thereof.

3. The method of claim 1, wherein the first set of audio data is output from the first sound source within the virtual scene and the second set of audio data is output from the second sound source within the virtual scene.

4. The method of claim 3, wherein the first sound source is output as sound from a first virtual object and the second sound source is output as sound from a second virtual object.

5. The method of claim 1, wherein the first soundfield includes a first plurality of pressure points, and the second soundfield includes a second plurality of pressure points.

6. A system for modifying spatial audio, comprising:

a processor configured to:

obtain a first set of metadata for a first set of audio data and a second set of metadata for a second set of audio data, wherein the first set of metadata, the second set of metadata, the first set of audio data, and the second set of audio data are associated with a display of a virtual scene;

encode the first set of audio data to output a first soundfield and the second set of audio data to output a second soundfield;

mix the first and second soundfields to output a mixed soundfield;

decode the mixed soundfield based on at least one of the first set of metadata and the second set of metadata to provide mixed audio data, wherein decoding the mixed soundfield includes:

identifying from the mixed soundfield and the first set of metadata, a first sound source and a first soundfield output by the first sound source;

identifying from the mixed soundfield and the second set of metadata, a second sound source and a second soundfield output by the second sound source;

adjusting, within the mixed soundfield, the first soundfield based on the first set of metadata to provide a first adjusted soundfield without adjusting, within the mixed soundfield, the second soundfield, wherein the first soundfield is adjusted without adjusting the second soundfield to provide an adjusted mixed soundfield; and converting the adjusted mixed soundfield to the mixed audio data; and output the mixed audio data as an audio output; and a memory device coupled to the processor.

7. The system of claim 6, wherein the mixed audio data has a different amplitude of sound output from the first sound source than an amplitude of sound output based on the first set of audio data, wherein the amplitude of sound output based on the first set of audio data is output from the first sound source, or wherein the mixed audio data has a different angular spread of sound output from the first sound source than an angular spread of sound output based on the first set of audio data, wherein the angular spread of sound output based on the first set of audio data is output from the first sound source, or a combination thereof.

8. The system of claim 6, wherein the first set of audio data is output as sound from the first sound source within the virtual scene and the second set of audio data is output as sound from the second sound source within the virtual scene.

9. The system of claim 8, wherein the first sound source is a first virtual object and the second sound source is a second virtual object.

10. The system of claim 6, wherein the first soundfield includes a first plurality of pressure points, and the second soundfield includes a second plurality of pressure points.

11. A non-transitory computer-readable medium containing program instructions for modifying spatial audio, wherein execution of the program instructions by one or more processors of a computer system causes the one or more processors to carry out operations of:

obtaining a first set of metadata for a first set of audio data and a second set of metadata for a second set of audio data, wherein the first set of metadata, the second set of metadata, the first set of audio data, and the second set of audio data are associated with a display of a virtual scene;

encoding the first set of audio data to output a first soundfield and the second set of audio data to output a second soundfield;

mixing the first and second soundfields to output a mixed soundfield;

decoding the mixed soundfield based on at least one of the first set of metadata and the second set of metadata to provide mixed audio data, wherein decoding the mixed soundfield includes:

identifying from the mixed soundfield and the first set of metadata, a first sound source and a first soundfield output by the first sound source;

identifying from the mixed soundfield and the second set of metadata, a second sound source and a second soundfield output by the second sound source;

adjusting, within the mixed soundfield, the first soundfield based on the first set of metadata to provide a first adjusted soundfield without adjusting, within the mixed soundfield, the second soundfield, wherein the first soundfield is adjusted without adjusting the second soundfield to provide an adjusted mixed soundfield; and converting the adjusted mixed soundfield to the mixed audio data; and outputting the mixed audio data as an audio output.

12. The non-transitory computer-readable medium of claim 11, wherein the mixed audio data has a different amplitude of sound output from the first sound source than an amplitude of sound output based on the first set of audio data, wherein the amplitude of sound output based on the first set of audio data is output from the first sound source, or wherein the mixed audio data has a different angular spread of sound output from the first sound source than an angular spread of sound output based on the first set of audio data, wherein the angular spread of sound output based on the first set of audio data is output from the first sound source, or a combination thereof.

13. The non-transitory computer-readable medium of claim 11, wherein the first set of audio data is output as sound from the first sound source within the virtual scene and the second set of audio data is output as sound from the second sound source within the virtual scene.

14. The non-transitory computer-readable medium of claim 13, wherein the first sound source is a first virtual object and the second sound source is a second virtual object.

* * * * *